March 15, 1955
C. S. STARR ET AL
2,704,102
CUSHION TIRES
Filed Oct. 14, 1949
2 Sheets-Sheet 1
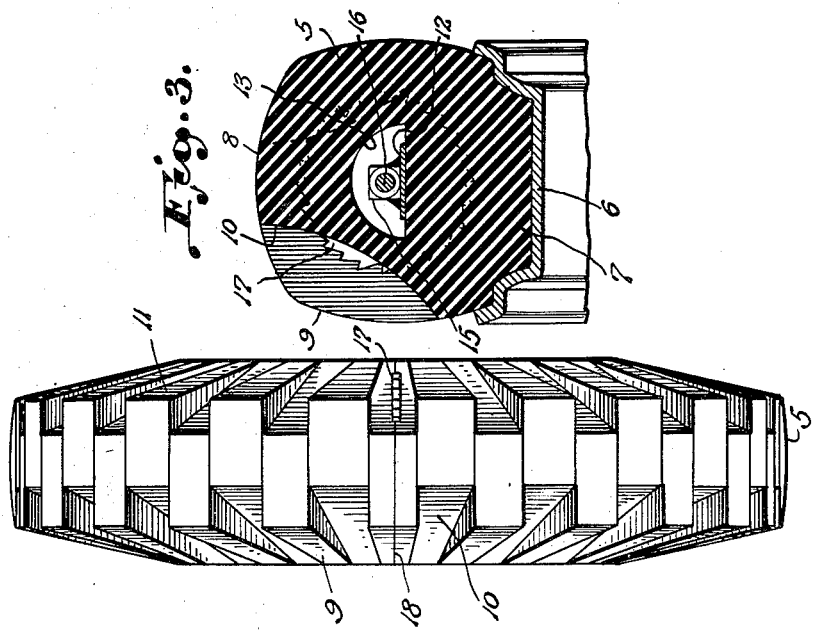
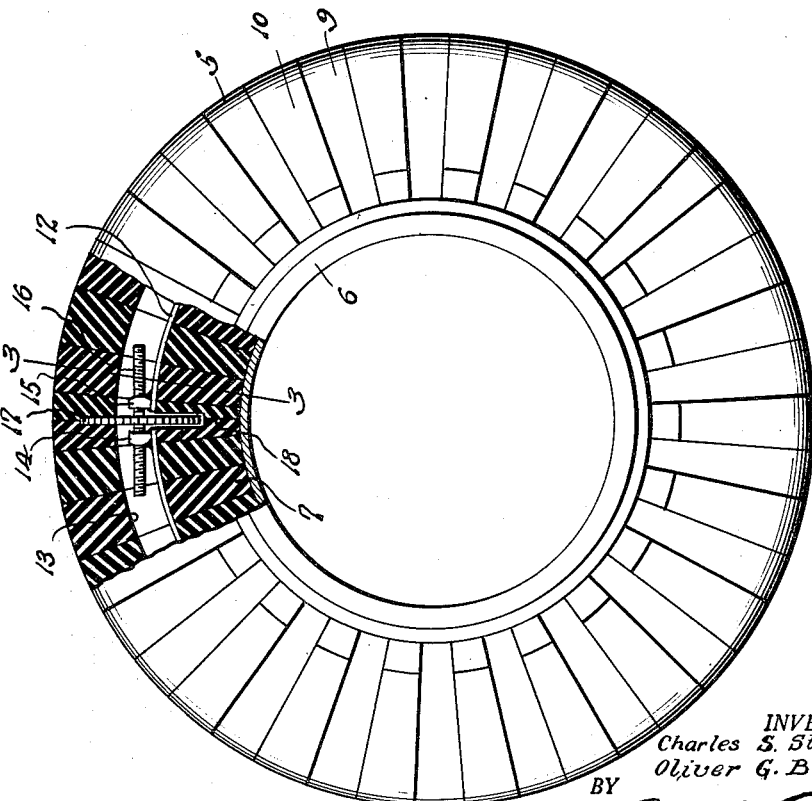
INVENTORS.
Charles S. Starr
Oliver G. Barnes
BY
Ralph Burch
ATTORNEY.

INVENTOR.
Charles S. Starr
Oliver G. Barnes
BY Ralph Burch
ATTORNEY.

United States Patent Office 2,704,102
Patented Mar. 15, 1955

2,704,102

CUSHION TIRES

Charles S. Starr, Hixon, and Oliver G. Barnes, Chattanooga, Tenn., assignors, by direct and mesne assignments, to Star-Barn Rubber Company, Chattanooga, Tenn., a corporation of Tennessee Application October 14, 1949, Serial No. 121,278

3 Claims. (Cl. 152—307)

This invention relates to cushion tires for vehicles.

It is an object of the invention to provide a tire composed of a plurality of individual sections of solid resilient material secured in abutting relation around the rim of a conventional vehicle wheel.

A further object of the invention resides in constructing the sections of the tire with a concave side wall and arranging the sections in alternate relation to provide traction cleats or lugs on each side of the tire.

A still further object of the invention resides in securing the sections of the tire in tight abutting relation by passing a contractible band through aligned openings in the sections having means for contracting the band to adjust the sections about the rim of the wheel.

Another object of the invention resides in providing a cushion tire which is simple and durable in construction, reliable and efficient in use and inexpensive to manufacture.

Other objects and advantages of the invention will be apparent during the course of the following description.

Figure 4:
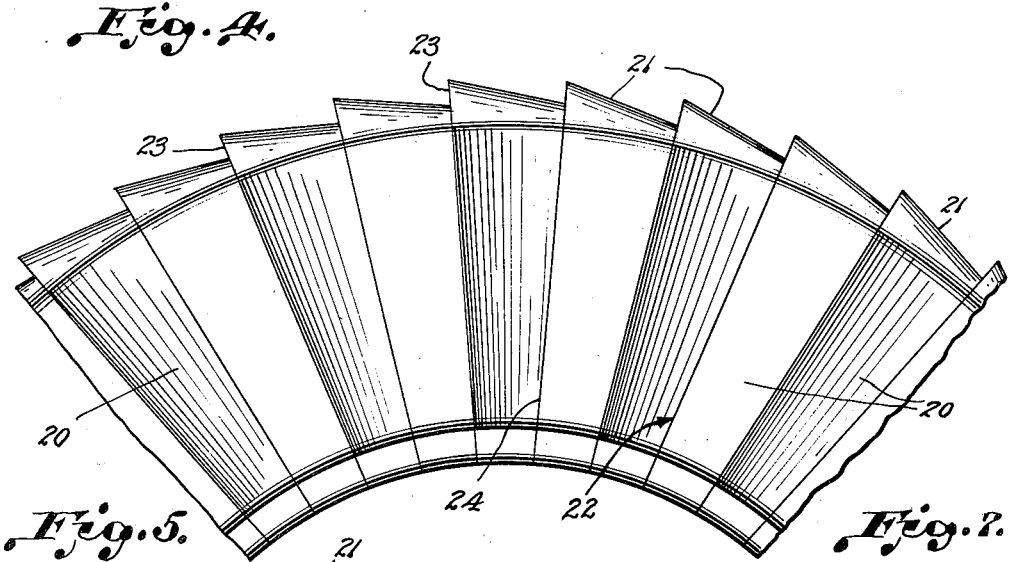
Figure 5:
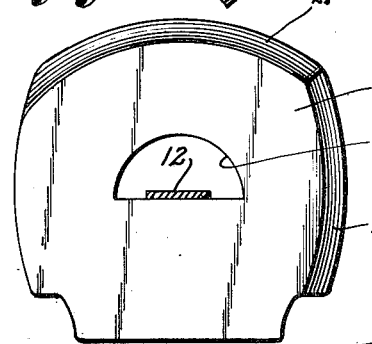
Figure 7:
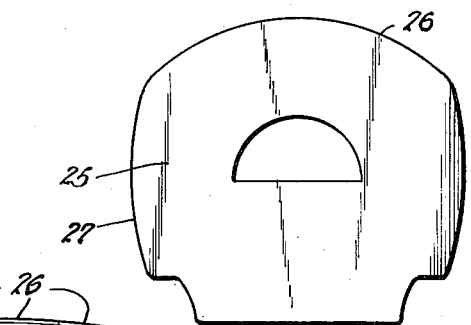
Figure 6:
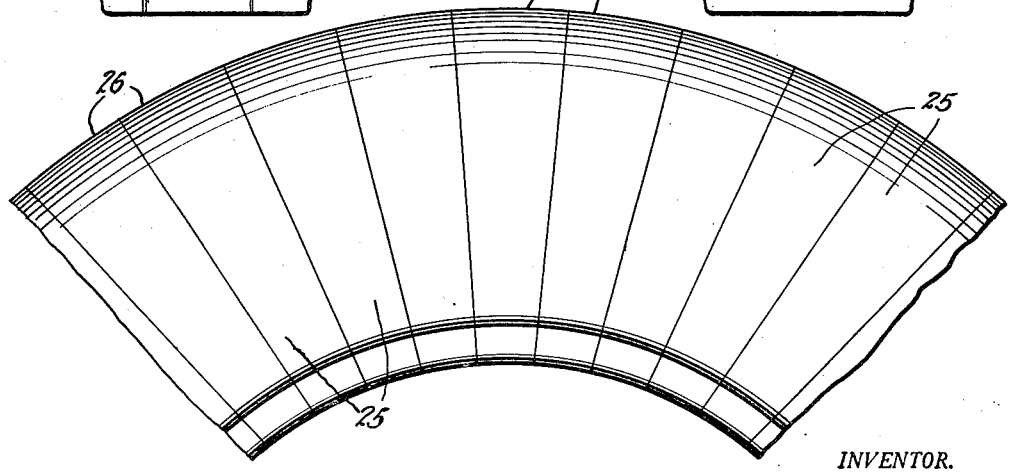

In the accompanying drawing forming a part of this specification and in which like numerals are employed to designate like parts throughout the same, Fig. 1 is a side elevational view of the tire, partly in section, Fig. 2 is an end elevation of the same, Fig. 3 is a cross section taken on line 3—3 of Fig. 1, Fig. 4 is a side elevation view of a modified form of the invention, Fig. 5 is an end view of a section of the tire shown in Fig. 4, Fig. 6 is a side elevation view of a further modified form of the invention, and, Fig. 7 is en end view of a section of the tire shown in Fig. 6.

Referring to the drawing the numeral 5 denotes a plurality of resilient sections joined together in abutting relation about the rim 6 of a conventional vehicle wheel. The sections 5 are constructed of rubber impregnated fabric or other suitable material having the desired degree of toughness and resiliency such as used in the manufacture of pneumatic tire casings. Each section has a base 7 shaped to conform to the shape of the rim 6 in which it is seated as shown in Fig. 3. The top 8 and one side wall face 9 are slightly convex in shape to conform susbtantially to the shape of the tread surface and side wall of a conventional tire. The opposite side wall face 10 is concave shape, the curved surface starting near the base and extending through the top face 8 so that the top face does not extend the full width of the section.

In assembling the sections around the rim 6 of the wheel the sections are arranged in alternate relation so the concave side wall of each succeeding section is at the opposite side of the tire. Thus, the convex side wall 9 will project beyond the concave faces of adjoining sections to form traction cleats or lugs 11 and the mud, snow or earth picked up by the traction lugs will be expelled from the side of the tire by the concave faces.

The sections are held upon the rim in tight abutting relation by a contractible metal band 12 extending through semi-circular openings 13 formed in the center of each section 5. The ends of the band are provided with right and left hand screw threaded lugs or nuts 14 and 15 which engage the right and left hand screw threaded ends of a shaft 16 connecting the ends of the band together. A toothed wheel or disc 17 is fixedly mounted on the center of shaft 16 between a divided section 18 of the tire and the periphery of the wheel projects from the concave face of the section where it may be turned by hand or a suitable tool to expand and contract the band 12.

After the sections 5 have been assembled on the band 12, in proper relation, the band is expanded by turning the wheel 17 so that the tire may be mounted on the rim of the vehicle. After the sections are seated in the rim, the wheel 17 is turned to contract the band 12 which draws the sections into tight abutting relation and at the same time firmly seats the tire in the rim. By providing the sections with a concave side wall face and alternately arranging the sections so the concave faces of the succeeding sections are at opposite sides of the tire, the non-concaved side walls of each section projects beyond the concaved side wall of the next adjacent section thereby forming a traction lug which will grip the mud or soft earth and prevent slipping or skidding. The tire is particularly designed for rough usage and will stand up under conditions which normally would render an ordinary tire inoperative.

In Figs. 4 and 5 a modified form of the tire is shown wherein the resilient sections 20 are provided with a beveled top or tread face 21 and a beveled side wall 22 so that when the sections are assembled on the wheel and compressed together by contracting the band 12, the tread surface of the tire will have spaced projecting traction ribs 23. Succeeding sections have the beveled side wall 22 at opposite sides to provide a series of ribs 24 on both sides of the tire.

A further modification of the invention is shown in Figs. 6 and 7 wherein the sections 25 are of the same size and shape to provide a smooth tread surface 26 and smooth side walls 27.

In all forms of the invention the sections are made from old pneumatic tire casings, a die of suitable shape and size being used for stamping or cutting the sections from the casing. Thus, each section will comprise layers of rubber impregnated fabric and layer of rubber which combine to provide a tough durable and yet resilient tread surface for the tire. However, it is apparent the sections may be made from any other suitable material.

It is to be understood the forms of our invention herein shown and described are to be taken as preferred examples of the same and that changes in the shape, size and arrangement of the parts may be made without departing from the spirit of the invention or scope of the subjoined claims.

Having thus described our invention, we claim:

1. A tire for vehicle wheels comprising a series of abutting resilient sections having their confronting faces tapered downwardly and inwardly, each section having its top wall beveled in a direction towards the next adjacent section with the higher edge of the beveled wall of each section projecting above the lower edge of the beveled wall of the next adjacent section, the alternate side walls of adjacent sections being beveled in a direction towards the next adjacent section, and means securing said sections together.

2. A tire for vehicle wheels comprising a series of abutting resilient sections having their confronting faces tapered downwardly and inwardly and provided with central alined apertures, each section having its top wall beveled in a direction towards the next adjacent section with the higher edge extending above the lower edge of the next adjacent section, the alternate side walls of adjacent sections being beveled in a direction towards the next adjacent section, a circular split band extending through the apertures of said sections and means for contracting said band to compress and hold said sections together.

3. A tire for vehicle wheels comprising a series of abutting resilient sections having their confronting faces tapered downwardly and inwardly, one face of each section being longer and wider than the other face, with the longer and wider face of each section abutting the shorter and narrower face of the adjacent section so that the longer and wider face projects beyond the shorter and narrower face to form traction ribs on the top and sides of the tire, and means securing said sections together.

References Cited in the file of this patent

UNITED STATES PATENTS

| | | |
|---|---|---|
| 824,778 | Burdick | July 3, 1906 |
| 846,453 | Cadwell | Mar. 12, 1907 |
| 871,159 | Baker | Nov. 19, 1907 |
| 939,619 | Nelson | Nov. 9, 1909 |
| 969,886 | Lighthouse | Sept. 13, 1910 |
| 969,889 | Lighthouse | Sept. 13, 1910 |
| 1,182,600 | Supernaw | May 9, 1916 |
| 1,522,448 | Harig | Jan. 6, 1925 |
| 2,367,834 | Kuhn | Jan. 23, 1945 |
| 2,403,309 | Smith | July 2, 1946 |

FOREIGN PATENTS

| | | |
|---|---|---|
| 463,776 | France | Dec. 26, 1913 |